United States Patent
Dussud et al.

(10) Patent No.: US 6,598,141 B1
(45) Date of Patent: Jul. 22, 2003

(54) MANIPULATING INTERIOR POINTERS ON A STACK DURING GARBAGE COLLECTION

(75) Inventors: Patrick H. Dussud, Bellevue, WA (US); Vance P. Morrison, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 102 days.

(21) Appl. No.: 09/803,240

(22) Filed: Mar. 8, 2001

(51) Int. Cl.[7] .............................................. G06F 17/30
(52) U.S. Cl. ..................... 711/170; 711/100; 711/154; 711/171; 711/172; 711/173; 707/201; 707/103; 707/206; 707/102
(58) Field of Search ............................... 707/102, 201, 707/206, 103; 711/170–173, 100, 154

(56) References Cited

U.S. PATENT DOCUMENTS

| | | | | |
|---|---|---|---|---|
| 5,321,834 A | * | 6/1994 | Weiser et al. ............... | 707/206 |
| 5,590,332 A | | 12/1996 | Baker ......................... | 395/705 |
| 5,652,883 A | * | 7/1997 | Adcock ....................... | 707/206 |
| 5,687,368 A | * | 11/1997 | Nilsen .................... | 707/103 R |
| 5,900,001 A | | 5/1999 | Wolczko et al. ............ | 707/206 |
| 5,903,900 A | * | 5/1999 | Knippel et al. ............. | 707/206 |
| 5,946,492 A | | 8/1999 | Bates ......................... | 395/709 |
| 5,999,732 A | | 12/1999 | Bak et al. ................... | 395/705 |
| 6,049,810 A | * | 4/2000 | Schwartz et al. ........... | 707/206 |
| 6,065,020 A | | 5/2000 | Dussud ....................... | 707/206 |
| 6,093,216 A | | 7/2000 | Adl-Tabatabai et al. ........ | 717/3 |
| 6,098,089 A | | 8/2000 | O'Conner et al. ........... | 709/104 |
| 6,101,580 A | | 8/2000 | Agesen et al. ............. | 711/132 |
| 6,105,041 A | | 8/2000 | Bennett et al. ............. | 707/206 |
| 6,115,782 A | * | 9/2000 | Wolczko et al. ............ | 711/100 |
| 6,125,434 A | | 9/2000 | Willard et al. ............... | 711/170 |
| 6,173,294 B1 | | 1/2001 | Azagury et al. ............ | 707/206 |
| 6,226,653 B1 | | 5/2001 | Alpern et al. ............... | 707/206 |
| 6,289,360 B1 | * | 9/2001 | Kolodner et al. ........... | 707/200 |
| 6,341,293 B1 | * | 1/2002 | Hennessey .................. | 707/206 |
| 6,434,575 B1 | * | 8/2002 | Berry et al. ................. | 707/101 |
| 6,446,257 B1 | * | 9/2002 | Pradhan et al. ............. | 717/154 |

OTHER PUBLICATIONS

Richter, J. "Garbage collection: Automatic Memory management in the Microsoft.NET Framwork", MSDN Magazine, Jan. 9, 2001, 12 pages.*

(List continued on next page.)

Primary Examiner—T. V. Nguyen
(74) Attorney, Agent, or Firm—Amin & Turocy, LLP (57) ABSTRACT

A system and method is provided for executing both managed and unmanaged code in a managed environment and managing memory employing a garbage collection system or service. The code may be precompiled, compiled in real-time or interpreted. The system and method identify roots including object references and interior references on a stack. The object references and interior references are then reported to the garbage collection system or service. The garbage collection system or service employs both the object references and interior references when tracing the heap for objects and data members within the objects. Memory segments that are inaccessible are then reclaimed for assignment to other objects. The garbage collection system or service may be invoked periodically by an operating system, a memory manager or some other service. Alternatively, the garbage collection system can be invoked in response to a request for memory by an executing program. The garbage collections system can also be invoked when the heap becomes full.

35 Claims, 8 Drawing Sheets

OTHER PUBLICATIONS

Hudson, R.L., et al., "*Cycles to Recycle: Garbage Collection on the IA–64*", *SIGPLAN Notices*, vol. 36, No. 1, Jan. 2001, p. 101–110.

Domani, T., et al., "*Implementing an On–The–Fly Garbage Collector for Java*", *SIGPLAN Notices*, vol. 36, No. 1, Jan. 2001.

Rodriquez–Rivera, G., et al., "*Conservative Garbage Collection for General Memory Allocators*", *SIGPLAN Notices*, vol. 36, No. 1, Jan. 2001, p. 71–79.

Amsaleg, L., et al.; "*Garbage Collection for a Client–Server Persistent Object Store*", *ACM Transactions on Computer Systems*, vol. 17, No. 3, Aug. 1999, p. 153–201.

Abdullahi, S., et al.; "*Garbage Collecting the Internet: A Survey of Distributed Garbage Collection*", *ACM Computing Surveys*, vol. 30, No. 3, Sep. 1998, pp. 330–373.

Rezaei, M. and Kavi, K.; "*A New Implementation Technique for Memory Management*", *Proceedings of the IEEE SoutheastCon 2000. 'Preparing for The New Millennium'*, 2000, p. 332–339.

Richter, J.; "*Garbage Collection: Automatic Memory Management in the Microsoft.NET Framework*", *MSDN Magazine*, http://msdn.microsoft.com/library/periodic/period00/gci.htm, Viewed Jan. 9, 2001, 12 pages.

\* cited by examiner

MANIPULATING INTERIOR POINTERS ON A STACK DURING GARBAGE COLLECTION

TECHNICAL FIELD

The present invention relates to the management of memory in computer systems, and more particularly to a system and method for automatic management of memory employing a garbage collector.

BACKGROUND OF THE INVENTION

Memory available for task execution is one of the most important resources in a computer system. Therefore, much time and energy has been directed to efficient utilization and management of memory. An important aspect of memory management is the manner in which memory is allocated to a task, deallocated and then reclaimed for use by other tasks. The process that dynamically manages the memory is referred to as the memory manager. The memory that the memory manager manages is referred to as the heap. When a program needs a block of memory to store data, the resource sends a request to the memory manager for memory. The memory manager then allocates a block of memory in the heap to satisfy the request and sends a reference (e.g., a pointer) to the block of memory to the program. The program can then access the block of memory through the reference.

Memory allocation and deallocation techniques have become very important in structured programming and object oriented programming languages. Memory allocated from a heap can be used to store information. Often this information is an instantiated object within an objected oriented paradigm. Conventionally, many programming languages have placed the responsibility for dynamic allocations and deallocation of memory on the programmer. These programming language types are referred to as unmanaged or unsafe programming languages, because pointers can be employed anywhere in an object or routine. In C, C++ and the Pascal programming languages, memory is allocated from the heap by a call procedure, which passes a pointer to the allocated memory back to the call procedure. A call to free the memory is then available to deallocate the memory. However, if a program overwrites a pointer, then the corresponding heap segment becomes inaccessible to the program. An allocated heap segment may be pointed to by several pointers, located on the stack or in another allocated heap segment. When all the pointers become overwritten, the heap segment becomes inaccessible. A program cannot retrieve from or write data to an inaccessible heap segment. These inaccessible heap segments are known as memory leaks.

Furthermore, dynamically allocated storage may become unreachable if no reference, or pointer to the storage remains in the set of root reference locations for a given computation. The "root set" is a set of node references such that the referenced node must be retained regardless of the state of the heap. A node is a memory segment allocated from the heap. Nodes are accessed through pointers. A node is reachable if the node is in the root set or referenced by a reachable node. Similarly, storage associated with a memory object can be deallocated while still referenced. In this case, a dangling reference has been created. In most programming languages, heap allocations is required for data structures that survive the procedure that created them. If these data structures are passed to further procedures or functions, it may be difficult or impossible for the programmer or compiler to determine the point at which it is safe to deallocate them. Memory objects that are no longer reachable, but have not been freed are called garbage.

Due to the above difficulties with reclamation of heap-allocated storage, automatic reclamation is an attractive alternative for dynamic memory management. The automatic identification and reclaiming of inaccessible heap segments is known as garbage collection. Garbage collection methodologies determine when a memory segment is no longer reachable by an executing program either directly or through a chain of pointers. When a memory segment is no longer reachable, the memory segment can be reclaimed and reused even if it has not been explicitly deallocated by the program. Garbage collection is particularly attractive to managed or functional languages (e.g., JAVA, Prolog, Lisp Smalltalk, Scheme). For example, the JAVA programming language has the characteristic that pointers can only be provided to reference objects (e.g., the head of an object). Thus, the garbage collection methodologies only need to identify object pointers during automatic reclamation of unreachable memory. Therefore, it is illegal to provide an interior pointer to reference a data member or field inside an object. However, unmanaged languages such as C and C++ allow interior pointers during development and execution of code. An interior pointer is a pointer into the heap that does not point at the base of an object. The garbage collection methodologies need to find all data reachable from an object including a description of its fields. Objects have these types of descriptions, which are reachable if the base of the object is known. However, when an interior pointer is received it is unknown where the base of the object is containing the data referenced by the interior pointer. Finding the base of the object is a relatively cumbersome and expensive operation. Therefore, unmanaged languages do not provide for automatic reclamation of dynamically allocated memory and some level of memory leaks inevitably go undetected despite high quality programming.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

A system and method is provided for executing both managed and unmanaged code in a managed environment and managing memory employing a garbage collection system or service. Managed code is code that manipulates objects that were allocated in the heap. Managed code is required to have a mechanism for enumerating all the live garbage collector pointers currently in use. Unmanaged code is code that does not manipulate garbage collector pointers and does not need to have a garbage collector enumeration mechanism. The code may be precompiled, compiled in real-time or interpreted. The system and method identify roots including object references and interior references on a stack. The object references and interior references are then reported to a garbage collection system or service. The garbage collection system or service employs the object references and interior references when tracing the heap for objects and data members (e.g., integer numbers, floating values, character fields, other objects) within the objects. Memory that is inaccessible is then reclaimed for assignment to other objects. The garbage collection system or service may be invoked periodically by an operating system, a memory manager or some other service. Alternatively, the garbage collection system can be invoked in response to a request for memory by an executing program. The garbage collections system can also be invoked when the heap becomes full.

In one aspect of the invention, a system and method is provided for identifying interior references (e.g., pointers) during execution of code in a run-time environment. Code is executed by a compiler (e.g., Just-In-Time compiler) and object references and interior references are stored in a process stack. The code can include both managed and unmanaged code. The interior references (e.g., references within an object) are created and stored on the stack by calls within the code. For example, a call to modify a field or data member within an object may be made within the code. In response, the compiler creates an interior reference, which is stored in the process stack. Dynamic memory management is employed periodically to cleanup dead or unused objects from the stack and/or a heap containing globally shared objects or the like. The dynamic memory management can be invoked in a response to a memory request. A code manager then scans the stack and passes both the object references and the interior references to a garbage collector. The garbage collector then employs both the object references and interior references to reclaim the storage allocated to objects that are no longer alive.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

DETAILED DESCRIPTION OF THE INVENTION

The present invention is now described with reference to the drawings. General purpose programming languages and other programmed systems often use references to locate and access objects. These objects can contain references to data members, such as integers, floating point numbers, character fields or other objects. The present invention is described with reference to a system and method for identifying object references and interior references on a stack. The object references and interior references are then passed to a garbage collection system or service. The garbage collection system or service employs both the object references and interior references when tracing the heap for objects. Objects that are inaccessible are then reclaimed for assignment to other objects. In one aspect of the invention, interior pointers are only allowed on the stack and not in the heap. Therefore, references are passed in languages and there is not a need for interior pointers in data fields. This provides for good expression without paying the performance penalty if interior pointers were allowed to reside in the heap. The garbage collection system or service may be invoked periodically by an operating system, a memory manager or some other service. Alternatively, the garbage collection system can be invoked in response to a request for memory by an executing program. The garbage collections system can also be invoked when the heap becomes full.

Figure 1:
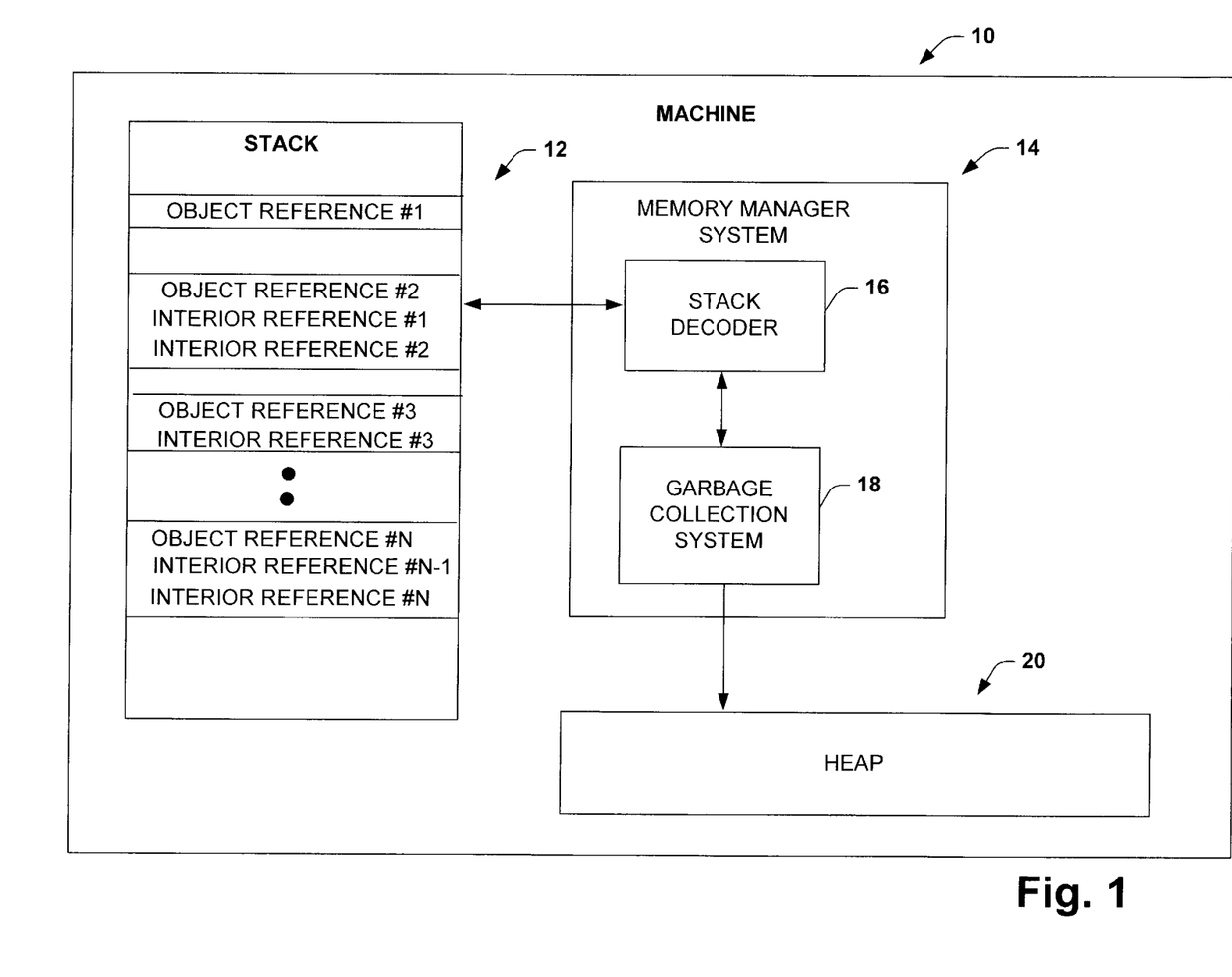
FIG. 1 illustrates a block diagram of a machine having a memory manager system in accordance with one aspect of the present invention.

FIG. 1 illustrates an example of a machine 10 including a process stack 12, a memory manager system 14 and a memory heap 16. During execution of one or more programs or processes on a machine, status information about executing programs are stored on the process stack 12, so that programs can call one another. When one programs calls another program, status information about the calling programs is stored on the stack 12, so that the calling program can resume its processing after the called program returns control of the processor to the calling program. The status information also includes processor register values of the process at the time the process relinquished control of the processor, object and variable declaration and calls and intermediate computational quantities, such as object references and interior references to the objects referenced. In the example of FIG. 1, the stack 12 includes, amongst other items, a number object references (e.g., pointers) that reference the location of a corresponding object in the memory heap 16. The objects can be grouped into frames (not shown). Each frame corresponds to one level of subroutine invocation or method invocation. The stack 12 also includes a number of interior references (e.g., pointers) that reference the location of data members (e.g., integer numbers, floating values, character fields, other objects) within the various objects. Since any number of programs may call the same objects and/or object data members, multiple references or interior references to an object can reside in the process stack 12. The object reference can also be located in another heap segment of the memory heap 20. The interior reference locations can be limited to residing on the stack.

A memory manager 14 dynamically manages the memory heap 20. When a program needs a segment of memory to store data, the program sends a request to the memory manager 14. The memory manager 14 allocates an object in the heap 20 to satisfy the request. The memory manager 14 then sends a reference to the object to the program. The program can then access the object through the reference. The memory manager 14 includes a stack decoder 16 and a garbage collection system 18. The memory manager 14 will invoke or receive an invocation to perform a garbage collection algorithm. Alternatively, the invocation can be a result of a request for memory by a program. The memory manager will then invoke the stack decoder 16, which will scan the stack 12 for the roots on the stack (e.g., object references and interior references). The stack decoder 16 then transmits the roots (e.g., object references and interior references) to the garbage collection system 18. The garbage collection system will then trace through the memory heap 20 to determine accessible objects using the object references and interior references.

Although the stack decoder 16 is illustrated as a separate component from the garbage collection system 18 within the memory manager system 14, it is to be appreciated that the stack decoder 16 can be integrated into the garbage collections system 18. Additionally, the stack decoder 16 can be a separate component outside the memory manager system 14. The main function of the decoder component 16 is to identify the roots within the stack 12 (e.g., object references and/or interior references) and provide those roots to the garbage collection system 18, so that the garbage collection system 18 can perform a clean up of the memory heap 20.

Every program or application executing on the machine 10 has a set of roots. Roots identify storage locations, which refer to objects on the managed heap. All of the global and static object pointers in a program are considered part of the program's roots. In addition, any local variable/parameter object pointers on a thread's stack are considered part of the program's roots. Furthermore, any CPU registers containing pointers to objects in the managed heap are also considered part of the program's roots.

Figure 2:
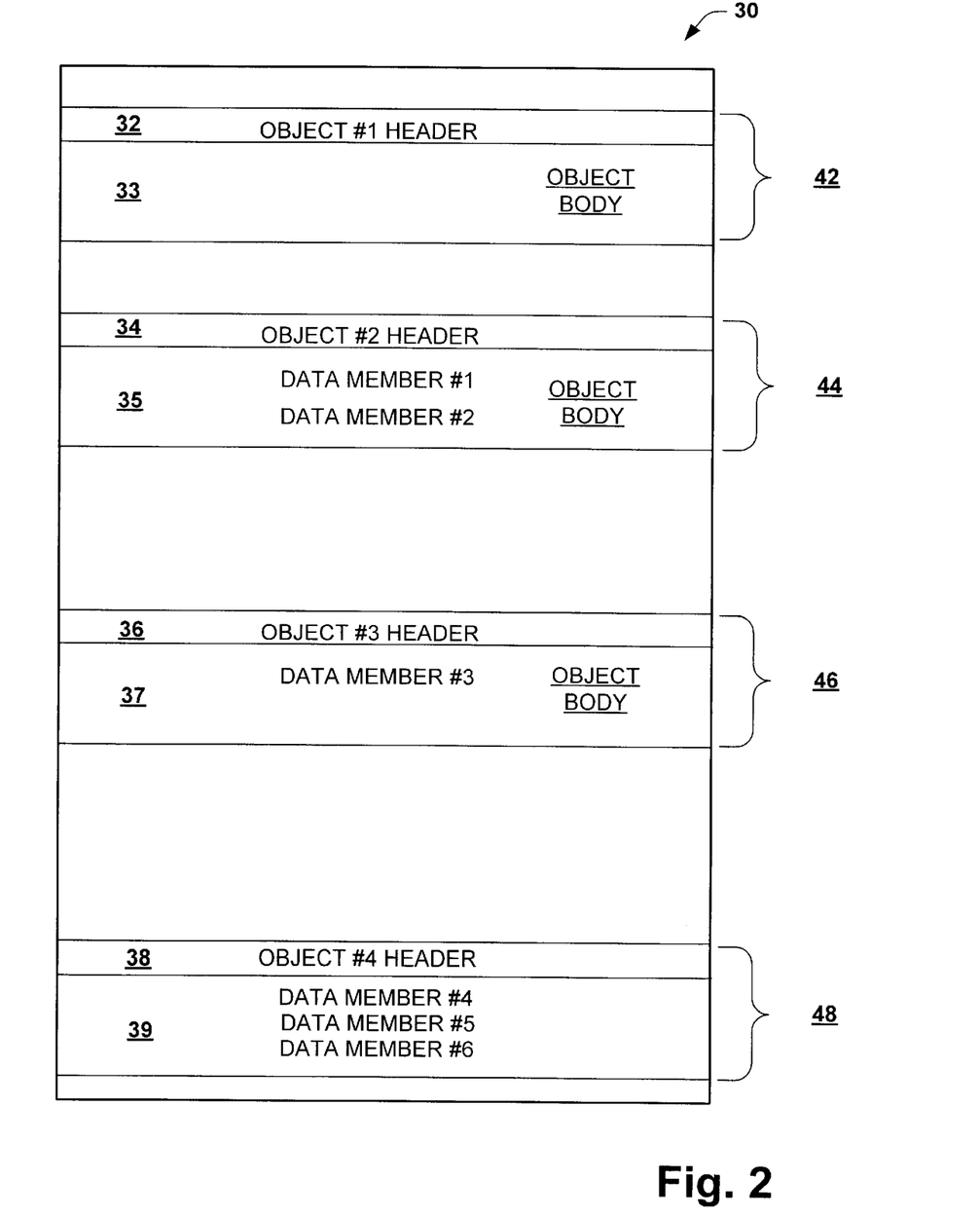
FIG. 2 illustrates a block diagram of a memory heap in accordance with one aspect of the invention.

FIG. 2 illustrates a block diagram of the contents of a memory heap 30. A plurality of objects reside in the memory heap 30. Each object includes a header and a body. The contents of the object headers are controlled by the operating system and are generally not accessible to users and application programs. The object header contains or refers to information that supports the instantiated object. The information in the object header often includes a pointer to a class definition, a methods table and an instance-variable count. The object references provide information on the locations of the object header. The object body is the part of the object that is visible to application programs and includes the variables and various fields used by the application programs. A first object 42 includes an object header 32 and an object body 33. A second object 44 includes an object header 34 and an object body 35. The object body 35 includes a first and a second data member. The data members can be integers, floating point numbers, character fields, data structures or pointers to other objects. In the present invention, object references can be found in the stack that reference the object headers, while interior references can be found in the stack that reference the data members within the object body. A third object 46 includes an object header 36 and an object body 37. The object body 37 includes a third data member. A fourth object 48 includes an object header 38 and an object body 39. The object body 39 includes a fourth, a fifth and a sixth data member.

As previously stated, the garbage collection system 18 will trace through the memory heap or walk the roots utilizing the object references and interior references to determine if objects referenced by the references are accessible. The garbage collector will build a graph of all object references reachable from the roots.

For example, if the garbage collection system 18 traces object reference #1 to the first object 42 in the heap 30, the garbage collection system will add the first object 42 to the graph. Additionally, if the garbage collection system notices that the first object 42 refers to the second object 44, then second object 44 is added to the graph. The garbage collection system continues to walk through all reachable objects recursively. If the garbage collection system 18 is tracing an interior reference, the garbage collections system will search for the object which straddle the interior reference. Once the object is found, it is traced normally as explained in the previous section. The search is accomplished by going from one object to the next in increasing memory address, until find one which intersects the interior pointer. Various techniques can be used to speed up the search.

Figure 3:
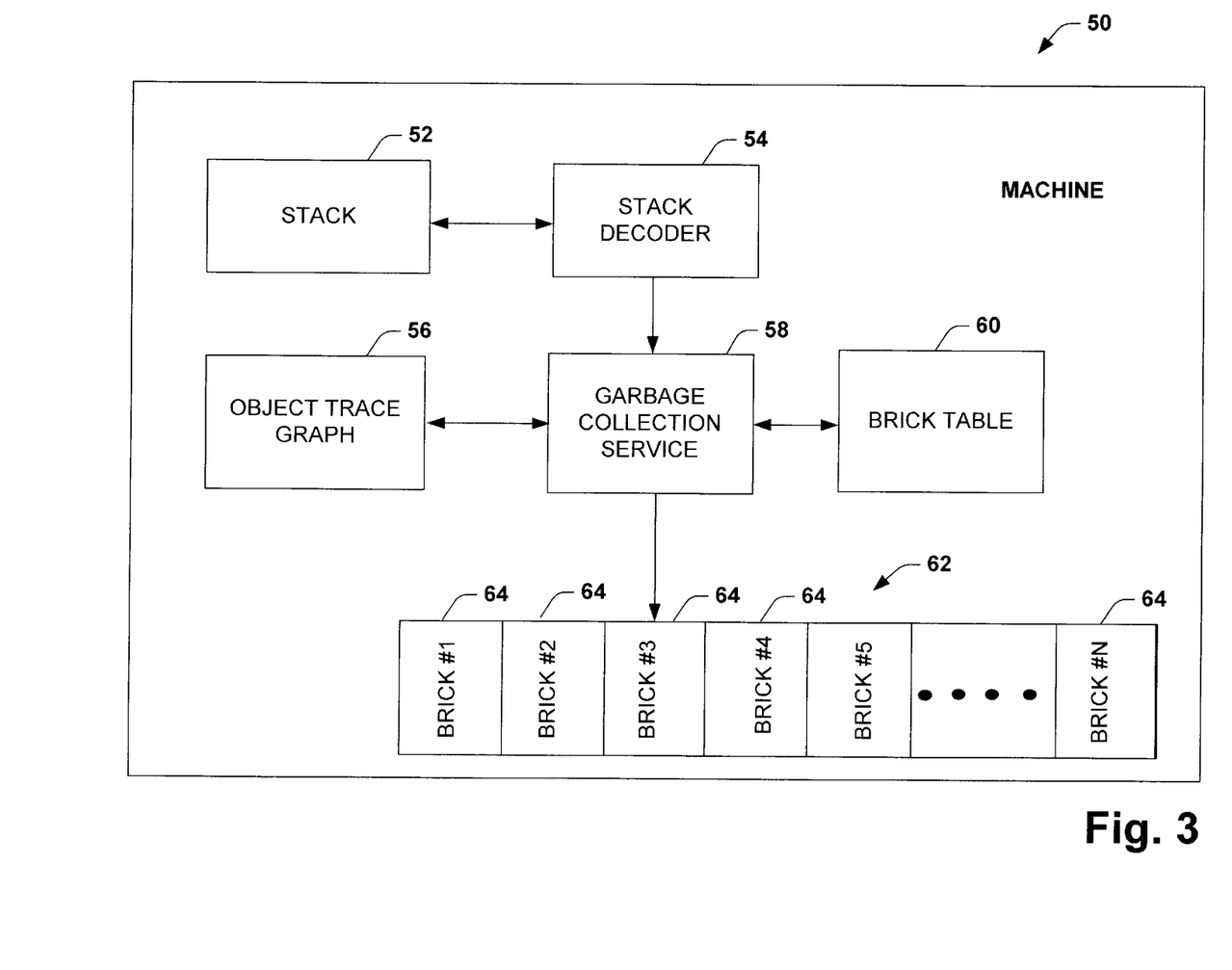
FIG. 3 illustrates a block diagram of a machine having components for locating interior references in accordance with one aspect of the present invention.

For example, as illustrated in FIG. 3, a machine 50 is provided that includes a stack 52, a stack decoder 54, a garbage collection service 58 and a heap 62. The heap 62 is logically divided into equal sized bricks 64 (e.g., 2 KB) and a brick table 60 is set up to contain for each brick, the address of an object within that brick. The stack decoder 54 decodes the stack 52 for object references and interior references. The object references and interior references and transmitted to the garbage collection services 58. The garbage collection service 58 traces the object references and its descendants and marks them in an object trace graph 56. The garbage collection service 68 traces interior references by first locating the object in which the interior reference resides. To search the object, the garbage collection service first determines the brick 64 that the interior reference falls into by dividing the address of the interior reference by the brick size. The garbage collection service then starts searching from the object contained in the brick table 60.

As the garbage collection service 58 walks through objects and data members, an attempt to add an object to the graph that was previously added will result in the garbage collection service 58 aborting walking down that path. This serves the purpose of significantly improving performance since the garbage collection service 58 doesn't walk through a set of objects more than once. Also, it prevents infinite loops if any circular linked lists of objects exist. Once all roots have been checked, the object trace graph 56 contains all the sets of all objects that are somehow reachable from the program's roots. The garbage collection service 58 then can shift the non-garbage objects down in memory removing all the gaps in the heap 62. The garbage collection service 58 then modifies the programs roots so that the references point to the objects new locations. The garbage collection service 58 also modifies any references to objects within objects.

Figure 4:
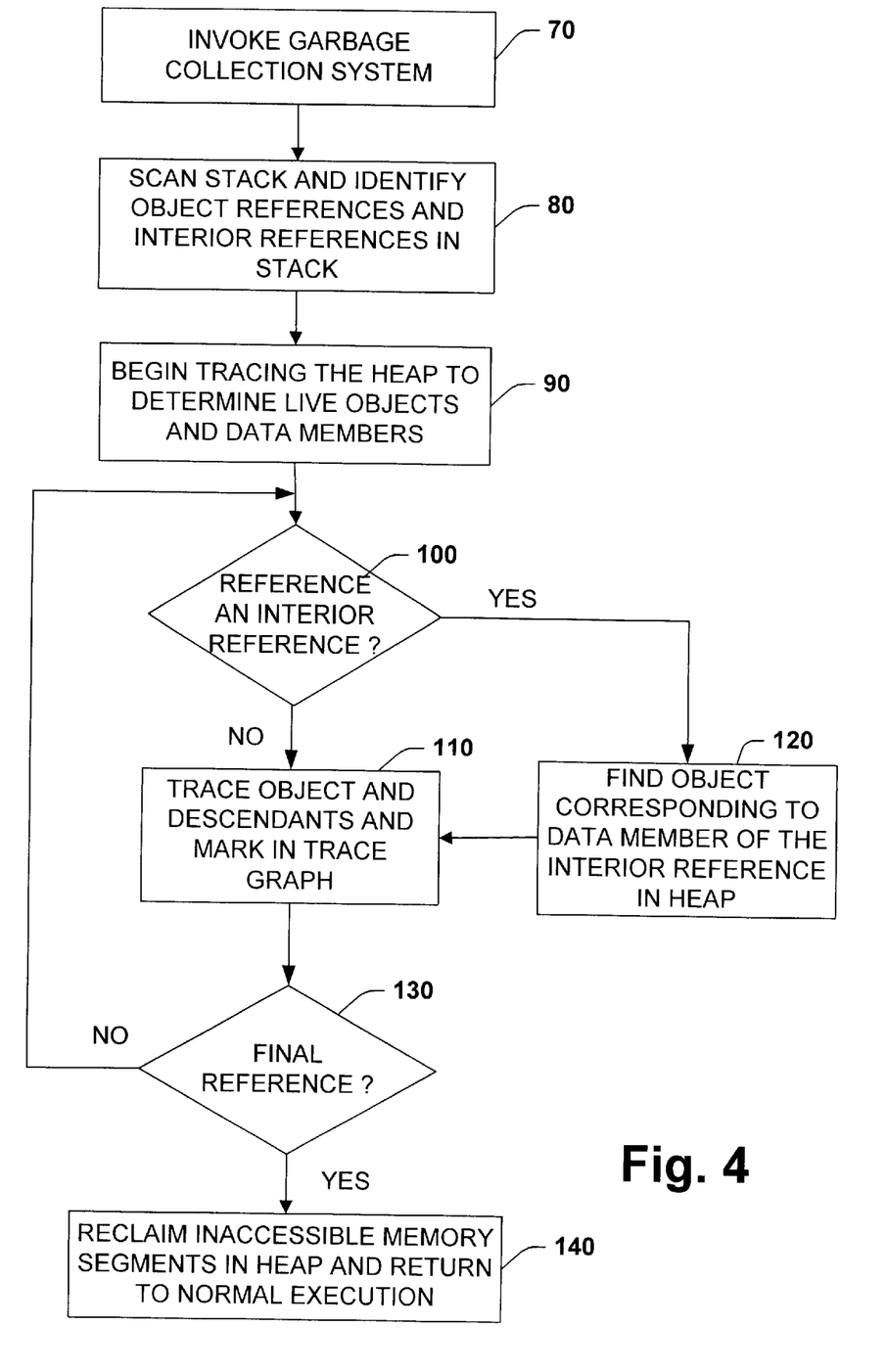
FIG. 4 illustrates a flow diagram of a methodology of reclaiming inaccessible memory segments in a heap in accordance with one aspect of the present invention.

In view of the foregoing structural and functional features described above, a methodology in accordance with various aspects of the present invention will be better appreciated with reference to FIG. 4. While, for purposes of simplicity of explanation, the methodology of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the following methodology may be implemented as computer-executable instructions, such as software stored in a computer-readable medium. Alternatively, the methodology may be implemented as hardware or a combination of hardware and software.

FIG. 4 illustrates one particular methodology for reclaiming inaccessible memory segments in a memory heap in accordance with the present invention. The methodology begins at 70 where a garbage collection system is invoked. At 80, the process stack is scanned and object references and interior references are identified. The garbage collection system begins tracing the memory heap to determine live objects and live data members at 90. The methodology then proceeds to 100 where the garbage collection system retrieves a reference and determines if a reference is an interior reference. If the reference is not an interior reference (NO), the methodology proceeds to 110. At 110, the garbage collection system traces the object and its descendants. If the object is found it is added to a trace graph and any references (e.g., descendants) found that were called out within that object are also added to the trace graph. The methodology then proceeds to 130. If it is determined that the reference is an interior reference (YES) at 100, the methodology proceeds to 120. At 120, the garbage collection system finds the object corresponding to interior reference in the heap. The methodology then proceeds to 110 and traces the object and its descendants. At 130, the methodology determines if the reference is a final reference. If the reference is not a final reference (NO), the garbage collection system returns to 100 to get another reference and determine if that reference is an interior reference. If the reference is a final reference (YES), the methodology proceeds to 140. At 140, the garbage collection system reclaims inaccessible memory segments in the heap and then returns control of the operations back to normal execution.

Figure 5:
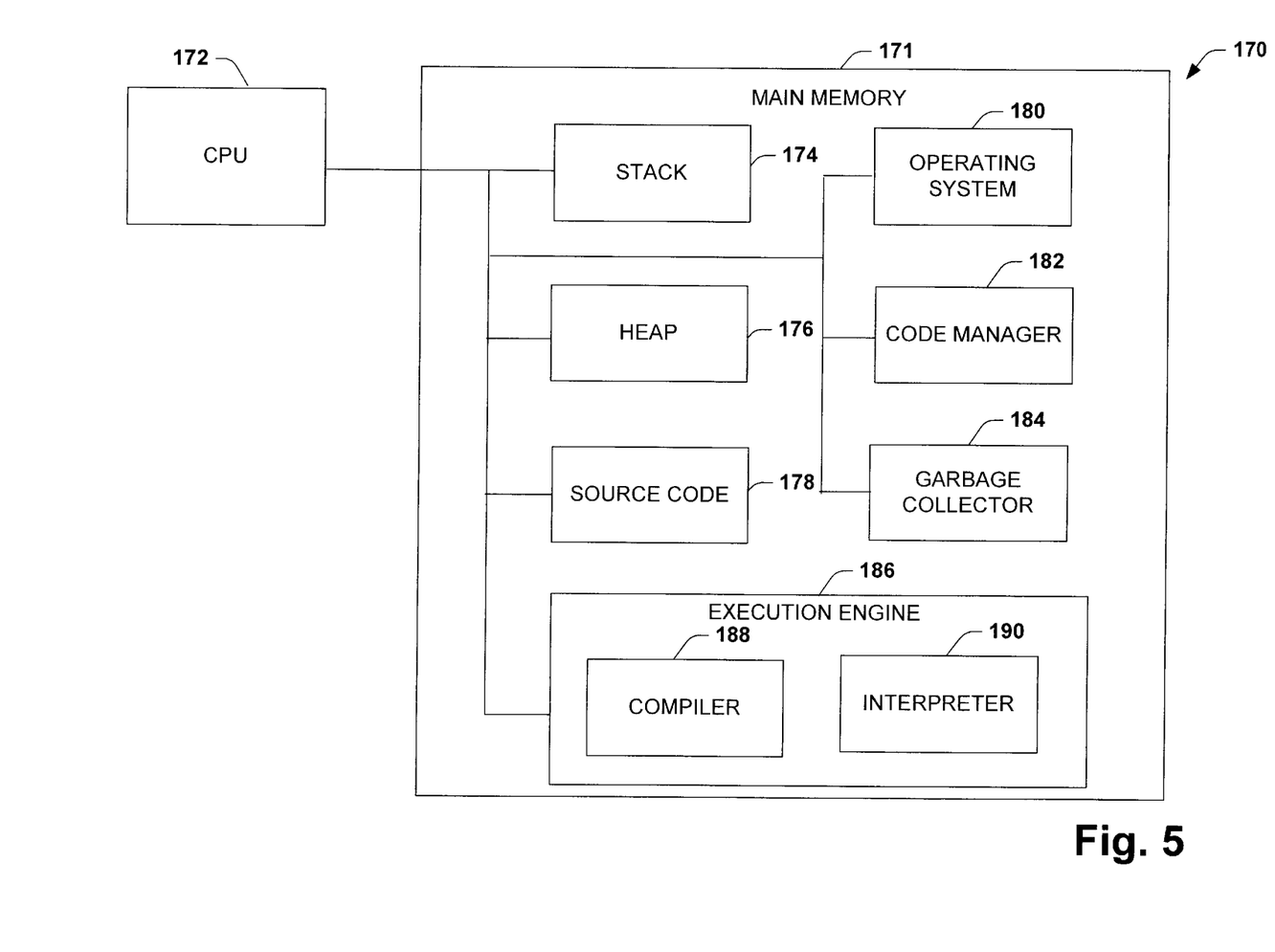
FIG. 5 illustrates a block diagram of components of a system in accordance with one aspect of the present invention.

FIG. 5 illustrates a block diagram of a system 170 in accordance with another aspect of the present invention. The system 170 includes a central processing unit 172 (CPU) and a main memory system 171. The main memory system 171 includes a number of components and programs residing in the main memory system 171. A process stack 174 resides in the main memory 171 for storing program and process states including object references and interior references. The main memory system 171 also includes a heap 176 for storing program data such as objects and data members within objects. An operating system 180 resides on the main memory system 171 and provides the mechanism for invoking programs on the system 170. The main memory 171 also includes an execution engine 186 that is used via the CPU 172 to compile or interpret source code 178. The execution engine 186 includes a compiler 188 and an interpreter 190. The source code 178 can be written in any number of languages including both managed code (e.g., JAVA) and unmanaged code (e.g., C, C++). A code manager 182 and a garbage collector 184 also reside in the main memory 171. The code manager 182 performs various functions including managing the execution of the source code, storing metadata regarding the source code and keeping track of both object references and interior references in the stack 174. The garbage collector 184 is operable to receive these object references and interior references from the code manager 182 and reclaim inaccessible memory from the heap 176.

During operation of the system 170, the CPU 172 executes code comprising the operating system 180. Application programs residing as source code 178 can be invoked through the operating system 180. The execution engine 186 reduces the source code 178 to an intermediate form or intermediate language for compiling or interpreting by the compiler 188 and interpreter 190, respectively. Compiled or interpreted code can then be linked with libraries (not shown) or the like, converted to machine code and executed by the CPU 172. During execution, various object references and interior references are stored in the stack 174 and various objects are stored in the heap 176. When memory is requested by the source code 178 being compiled or interpreted, an invocation command is sent to the code manager 182. The code manager includes a stack decoder service in addition to other services, such as error handling. The code manager is a mechanism for enumerating the garbage collector references that the code is currently manipulating, which almost resides exclusively on the stack. The other place being the machine registers. The code manager 182 then scans the stack and identifies object references and interior references. The code manager 182 then passes these object references and interior references to the garbage collector 184. The garbage collector 184 then employs the object references and interior references in reclaiming inaccessible memory segments in the heap 176, as previously described.

Figure 6:
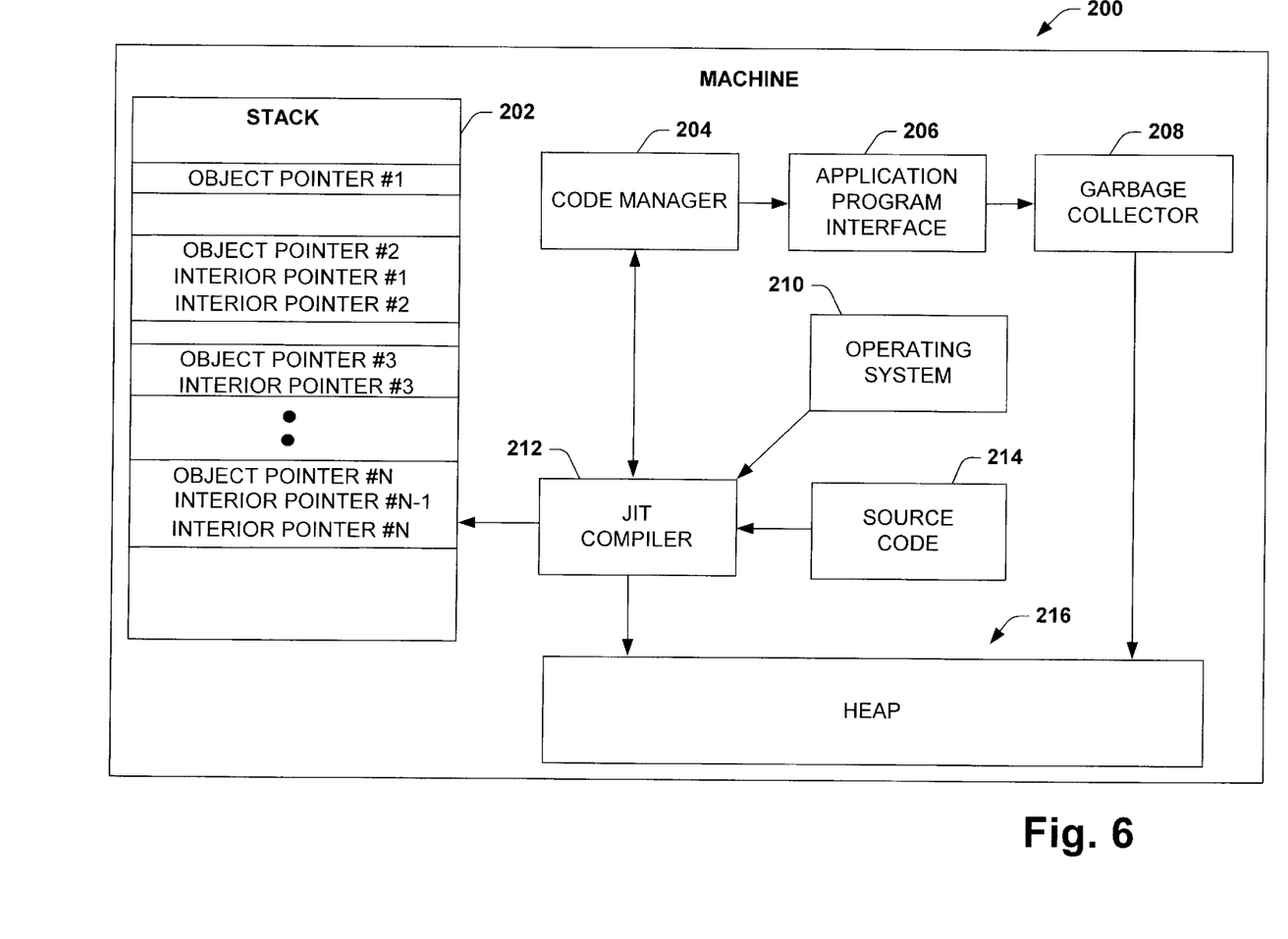
FIG. 6 illustrates a block diagram of various programs and components on a machine in accordance with one aspect of the present invention.

FIG. 6 illustrates a block diagram of the interaction of various program and components residing on a machine 200. The machine 200 includes an operating system 210 for providing a general environment to the machine 200. The operating system 210 is operable to invoke one or more programs for execution on the machine 200. The operating system 210 invokes a Just-In-Time (JIT) compiler 212 to begin compiling source code 214. The compiler 212 is operable to compile both managed languages and unmanaged languages. For example, the source code can be precompiled in to an intermediate language code prior to compiling by the JIT compiler 212. The JIT compiler can be formed of two compilers, one for managed code and one for unmanaged code. The intermediate language code can then be compiled into object code and the managed code and unmanaged code linked and converted to machine code for execution by the machine 200. During execution of one or more programs or processes on the machine 200, status information about executing programs are stored on a stack 202, so that programs can call one another. The status information includes both object pointers and interior pointers to data members within the objects referenced. In the example of FIG. 6, the stack 202 includes, amongst other items, a number object pointers that reference the location of a corresponding object in a memory heap 216. The stack 202 also includes a number of interior pointers that reference the location of data members (e.g., integer numbers, floating values, character fields, other objects) within the various objects. Since any number of programs may call the same objects, an object pointer or interior pointer can reside in the process stack 202 a number of times. The object pointer or interior pointer can also be located in another heap segment.

A code manager 204 is provided to dynamically manage the heap memory 216. The code manager includes a stack decoder service in addition to other services, such as error handling. When a program needs a segment of memory to store data, the program sends a request to the code manager 204. The code manager 204 will scan the stack 202 for the roots on the stack 202 (e.g., object pointers and interior pointers). The code manager 204 then reports the roots (e.g., object pointers and interior pointers) to a garbage collector 208 through an application program interface 206 (API). The garbage collector 208 will then trace through the memory heap 216 to determine inaccessible objects using the object pointers and interior pointers. The garbage collector 208 then moves the accessible objects and adjusts the pointers accordingly. The JIT compiler 212 then provides the program with a memory segment corresponding to the request.

Figure 7:
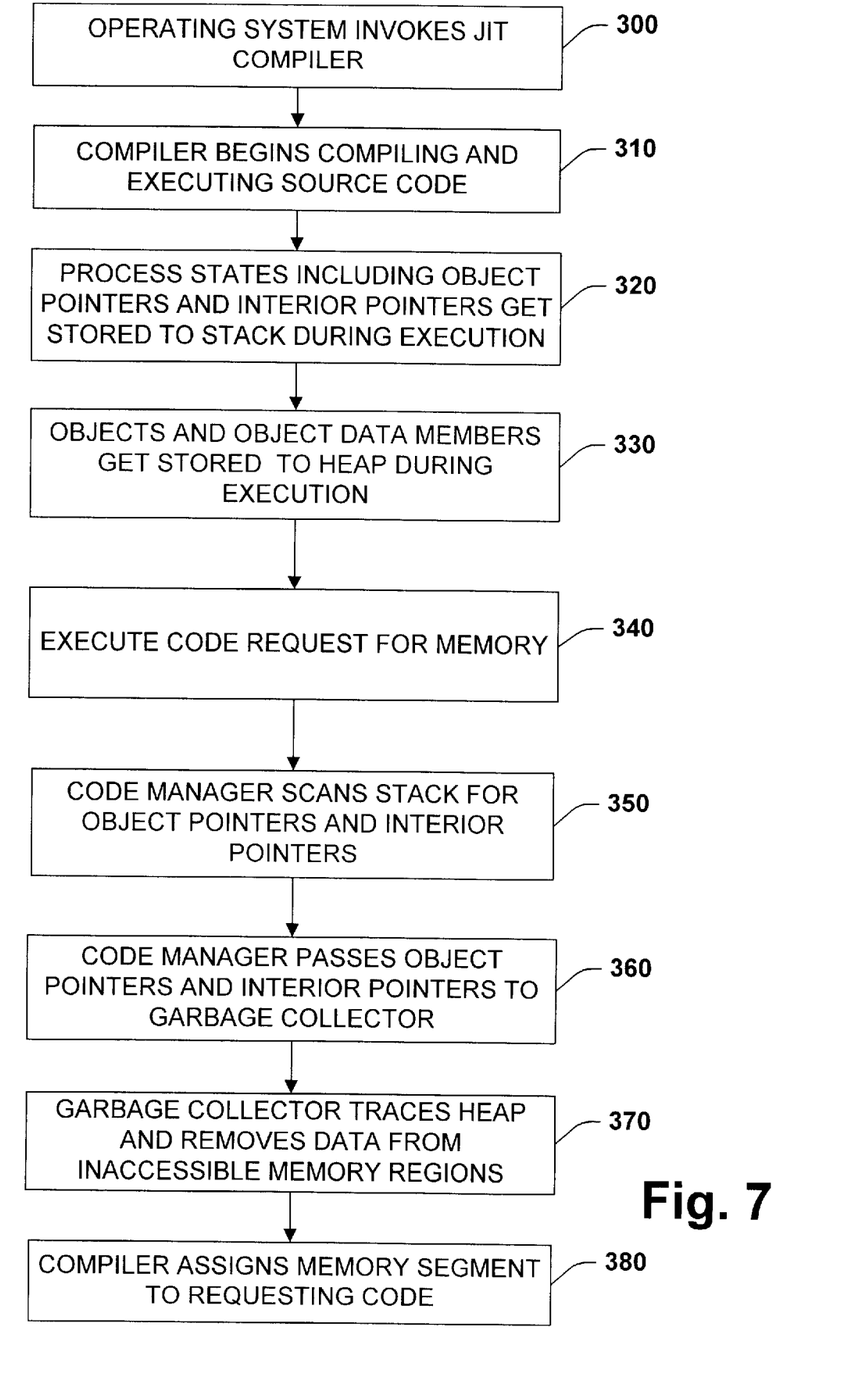
FIG. 7 illustrates a flow diagram of a methodology for reclaiming inaccessible memory segments in a heap and assigning a memory segment based on a request from a program in accordance with one aspect of the invention.

In view of the foregoing structural and functional features described above, a methodology in accordance with various aspects of the present invention will be better appreciated with reference to FIG. 7. While, for purposes of simplicity of explanation, the methodology of FIG. 7 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the following methodology may be implemented as computer-executable instructions, such as software stored in a computer-readable medium. Alternatively, the methodology may be implemented as hardware or a combination of hardware and software.

FIG. 7 illustrates one particular methodology for reclaiming inaccessible memory segment in a heap and assigning a memory segment based on a request from a program in accordance with one aspect of the present invention. The methodology begins at 300 where the operating system invokes the JIT compiler based on a request for running an application program. At 310, the JIT compiler begins compiling source code and the processor begins executing the compiled code. At 320, process states including object pointers and interior pointers get stored on the stack during execution. At 330, objects and object data members get stored to the heap during execution. At 340, the executing code requests memory. At 350, the code manager scans the stack and identifies object references and interior references. The code manager then passes the object references and the interior references to the garbage collector service at 360. At 370, the garbage collector traces the heap and removes data from inaccessible memory regions. The methodology then proceeds to 380 where the compiler assigns an available memory segment to the requesting code.

Figure 8:
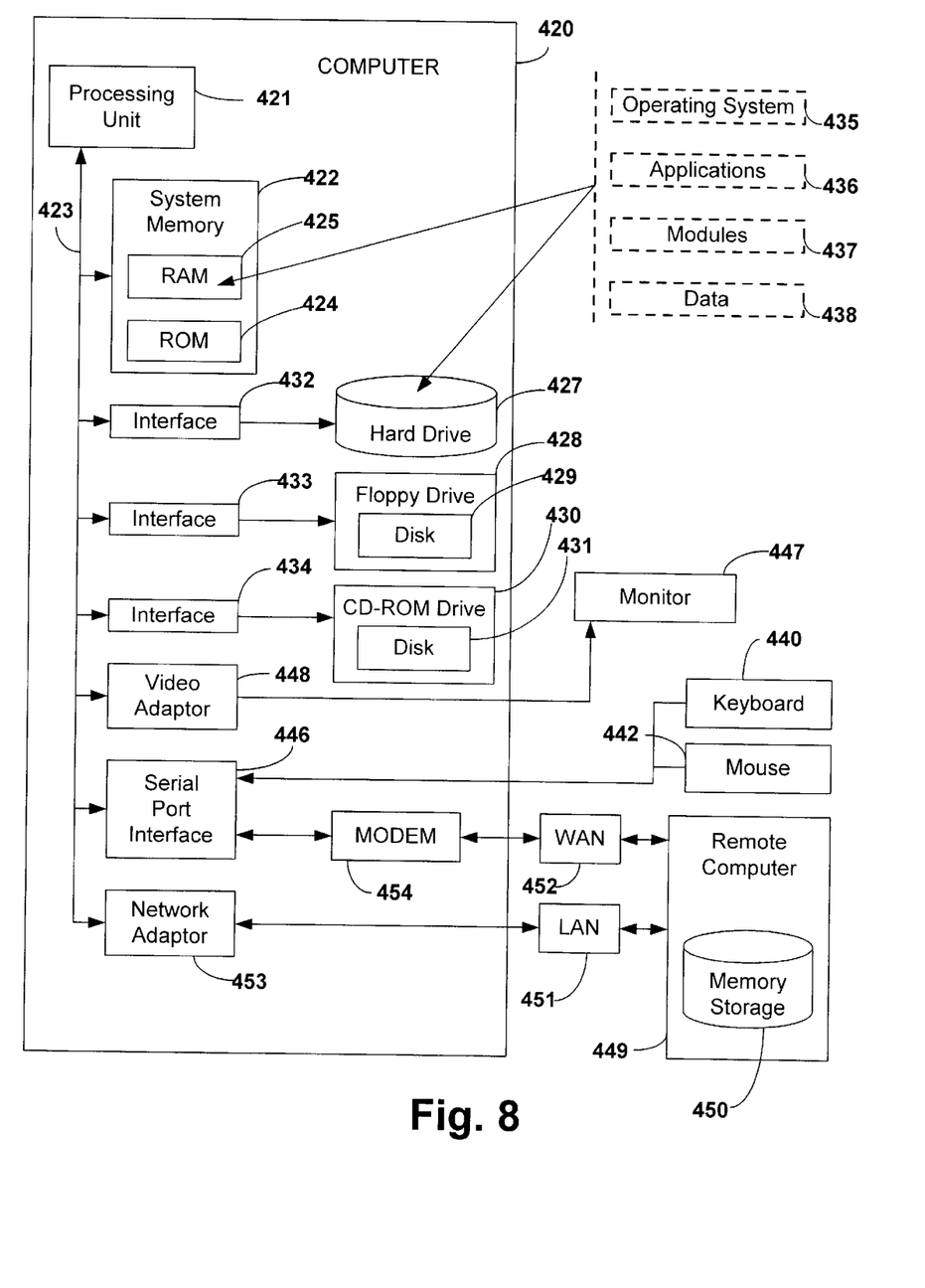
FIG. 8 illustrates a block diagram of a computer system in accordance with an environment of the present invention.

With reference to FIG. 8, an exemplary system for implementing the invention includes a conventional personal or server computer 420, including a processing unit 421, a system memory 422, and a system bus 423 that couples various system components including the system memory to the processing unit 421. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 421.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 424 and random access memory (RAM) 425. A basic input/output system (BIOS), containing the basic routines that help to transfer information between elements within the computer 420, such as during start-up, is stored in ROM 424.

The computer 420 further includes a hard disk drive 427, a magnetic disk drive 428, e.g., to read from or write to a removable disk 429, and an optical disk drive 430, e.g., for reading a CD-ROM disk 431 or to read from or write to other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage of data, data structures, computer-executable instructions, etc. for the server computer 420. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 425, including an operating system 435, one or more application programs 436, other program modules 437, and program data 438. A user may enter commands and information into the computer 420 through a keyboard 440 and pointing device, such as a mouse 442. Other input devices (not shown) may include a microphone, joystick, game pad, satellite dish, scanner, or the like. These and other input devices are often connected to the processing unit 421 through a serial port interface 446 that is coupled to the system bus, but may be connected by other interfaces, such as a parallel port, game port or a universal serial bus (USB). A monitor 447 or other type of display device is also connected to the system bus 423 via an interface, such as a video adapter 448. In addition to the monitor, computers typically include other peripheral output devices (not shown), such as speakers and printers.

The computer 420 may operate in a networked environment using logical connections to one or more remote computers, such as a remote server or client computer 449. The remote computer 449 may be a workstation, a server computer, a router, a peer device or other common network node, and typically includes many or all of the elements described relative to the computer 420, although only a memory storage device 450 has been illustrated in FIG. 8. The logical connections depicted in FIG. 8 include a local area network (LAN) 451 and a wide area network (WAN) 452. Such networking environments are commonplace in offices, enterprise-wide computer networks, intranets and the Internet.

When used in a LAN networking environment, the computer 420 is connected to the local network 451 through a network interface or adapter 453. When used in a WAN networking environment, the server computer 420 typically includes a modem 454, or is connected to a communications server on the LAN, or has other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing a communications link between the computers may be used.

In accordance with practices of persons skilled in the art of computer programming, the present invention is described below with reference to acts and symbolic representations of operations that are performed by the computer 420, unless indicated otherwise. Such acts and operations are sometimes referred to as being computer-executed. It will be appreciated that the acts and symbolically represented operations include the manipulation by the processing unit 421 of electrical signals representing data bits which causes a resulting transformation or reduction of the electrical signal representation, and the maintenance of data bits at memory locations in the memory system (including the system memory 422, hard drive 427, floppy disks 429, and CD-ROM 431) to thereby reconfigure or otherwise alter the computer system's operation, as well as other processing of signals. The memory locations where data bits are maintained are physical locations that have particular electrical, magnetic, or optical properties corresponding to the data bits.

The present invention has been illustrated with respect to a programming methodology and/or computer architecture and a particular example, however, it is to be appreciated that various programming methodology and/or computer architecture suitable for carrying out the present invention may be employed and are intended to fall within the scope of the hereto appended claims.

The invention has been described with reference to the preferred aspects of the invention. Obviously, modifications and alterations will occur to others upon reading and understanding the foregone detailed description. It is intended that the invention be construed as including all such modifications alterations, and equivalents thereof.

What is claimed is:

1. A system for executing code employing a garbage collector service, the system comprising;
   a stack decoder operable to identify a set of roots of an executing program on a process stack, the set of roots comprising object references and interior references; and
   a garbage collection service operable to receive the object references and interior references from the stack decoder and trace through a memory heap employing the object references and interior references to determine which memory segments are inaccessible.

2. The system of claim 1, the object references being pointers to object headers residing in the memory heap and the interior references being pointers to data members residing in object bodies in the memory heap.

3. The system of claim 1, the system being operable to execute managed and unmanaged code.

4. The system of claim 1, the stack decoder and garbage collection system being invoked by a request for memory by the executing code.

5. The system of claim 1, the stack decoder and garbage collection system being invoked periodically by a memory management system.

6. The system of claim 1, the stack decoder and garbage collection system being invoked when the memory heap becomes full.

7. The system of claim 1, the stack decoder and garbage collection service being part of a garbage collection system.

8. The system of claim 1, the garbage collection service being further operable to shift the non-garbage objects down in the memory heap to eliminate the inaccessible segments and to modify the program roots so that the references refer to the new locations of the objects in the memory heap.

9. The system of claim 1, the memory heap being segmented into a plurality of blocks wherein the garbage collection service traces interior references by scanning through the blocks until the block with the object containing the interior reference is found.

10. The system of claim 1, further comprising an execution engine operable to convert the code for execution to object code and a processor operable to execute the object code as it is converted from object code to machine code.

11. The system of claim 10, execution engine comprising a just-in-time compiler adapted to compile both managed source code and unmanaged source code in real-time.

12. The system of claim 1, the stack decoder being a code manager adapted to manage execution of the code.

13. The system of claim 1, the interior references being limited to residing on the stack.

14. A system for executing code in real-time, the system comprising:
    a compiler operable to compile source code into executable code for executing one or more programs;
    a processor operable to execute the executable code and store objects within a memory heap and object references and interior references in a stack during execution of the executable code; and
    a memory management system being operable to locate the object references and interior references and reclaim storage being utilized by unused objects.

15. The system of claim 14, the object references being pointers to object headers residing in the memory heap and the interior references being pointers to data members residing in object bodies in the memory heap.

16. The system of claim 14, the system being operable to execute managed and unmanaged code.

17. The system of claim 14, the memory manager system comprising a code manager operable to locate the object references and interior references and a garbage collector operable to reclaim storage being utilized by unused objects.

18. The system of claim 14, memory manager system being invoked by a request for memory by the executing code and the compiler allocating memory to the executing code after the memory manager has located the object references and interior references and reclaimed storage being utilized by unused objects.

19. The system of claim 14, the compiler being a just-in-time compiler adapted to compile both managed source code and unmanaged source code in real-time.

20. The system of claim 14, the interior references being limited to residing on the stack.

21. A method of garbage collection during execution of code on a machine, comprising:
    receiving a request for memory during execution of code;
    identifying object references and interior references in a process stack;
    tracing a memory heap employing the object references and interior references to determine inaccessible memory objects;
    removing the inaccessible memory objects from the heap; and
    allocating a segment of memory corresponding to the request.

22. The method of claim 21, the object references being pointers to object headers residing in the memory heap and the interior references being pointers to data members residing in object bodies in the memory heap.

23. The method of claim 21, the execution of code comprising executing both managed and unmanaged code.

24. The method of claim 21, the memory heap being segmented into a plurality of blocks wherein the garbage collection service traces interior references by scanning through the blocks until the block with the object containing the interior reference is found.

25. The method of claim 24, further comprising adding objects found accessible during the tracing of the memory heap to a graph.

26. The method of claim 21, wherein removing the inaccessible memory objects from the heap comprises shifting non-garbage objects down in the memory heap to eliminate inaccessible segments and modifying the object references and interior references to refer to the new locations of the objects in the memory heap.

27. A computer-readable medium having computer-executable instructions for performing the steps comprising:

compiling source code for execution;

executing the compiled source code;

storing objects on a memory heap during execution of the compiled code;

storing object references and interior references in a process stack during execution of the compiled code, the object references being pointers to object headers residing in the memory heap and the interior references being pointers to data members residing in object bodies in the memory heap; and reclaiming inaccessible objects periodically by scanning the stack to identify the object references and interior references, tracing the heap for inaccessible objects corresponding to the object references and interior references and removing objects that have been determined to be inaccessible.

28. The computer readable medium of claim 27, the source code being both managed and unmanaged code.

29. The computer readable medium of claim 28, wherein source code is compiled by a just-in-time compiler in real-time.

30. The computer readable medium of claim 29, wherein scanning the stack to identify the object references and interior references is performed by a code manager.

31. The computer readable medium of claim 28, the code manger reporting the object references and interior references to a garbage collector, wherein the garbage collector traces the heap for inaccessible objects corresponding to the object references and interior references and removes objects that have been determined to be inaccessible.

32. The computer readable medium of claim 27, wherein a garbage collection system traces the heap for inaccessible objects corresponding to the object references and interior references and removes objects that have been determined to be inaccessible.

33. A system for garbage collecting during execution of code on a machine, comprising:

means for identifying object references and interior references in a process stack; and means for tracing a memory heap employing the object references and interior references to determine inaccessible memory objects, the means for tracing a memory heap comprising means for removing the inaccessible memory objects from the heap.

34. The system of claim 33, further comprising means for compiling both managed and unmanaged code in real-time and means for storing object references and interior references in the process stack and means for storing objects in the memory heap.

35. The system of claim 33, further comprising means for invoking the system.

\* \* \* \* \*